June 7, 1938.  A. C. SCHMITT  2,119,929
SPINDLE CUTTER
Filed March 31, 1937
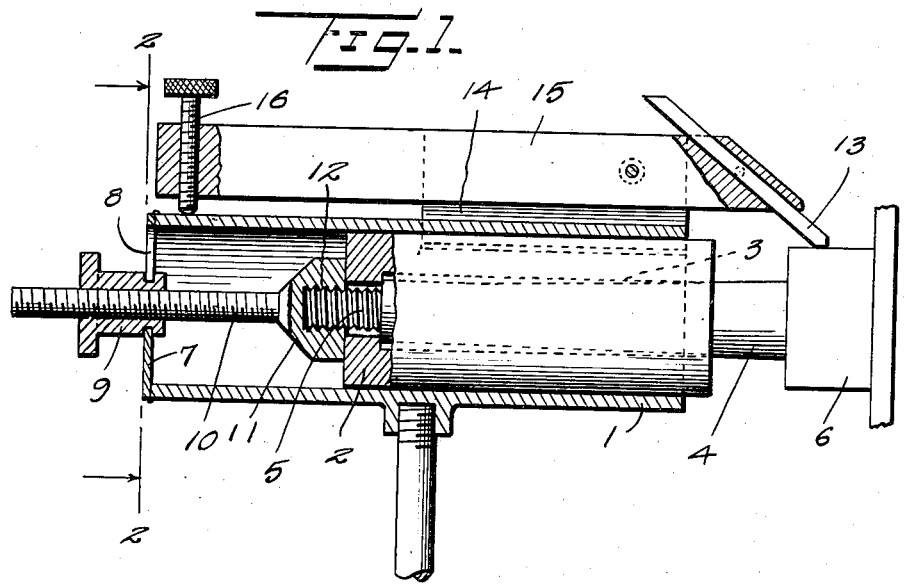
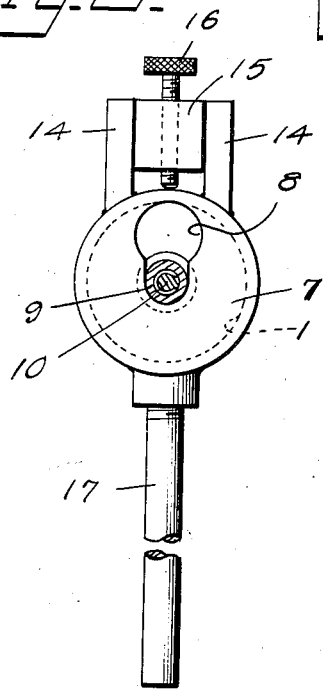
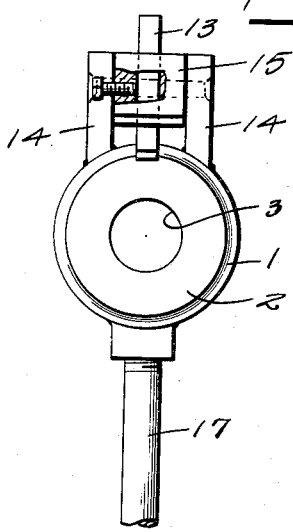
A. C. Schmitt
INVENTOR
BY Victor J. Evans & Co.
ATTORNEY Patented June 7, 1938

2,119,929

UNITED STATES PATENT OFFICE 2,119,929

SPINDLE CUTTER

Albert C. Schmitt, St. Nazianz, Wis.

Application March 31, 1937, Serial No. 134,181

1 Claim. (Cl. 82—4)

This invention relates to cutters especially adapted for dressing down brake flange bearings of axle spindles for the purpose of bushing said bearings when worn to eliminate looseness and noises incident thereto and has for the primary object the provision of a portable and efficient device of this character which will be simple to operate and permit dressing down of bearings to be accurately accomplished and which may be manufactured and sold at a low cost.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation partly in section illustrating a cutter constructed in accordance with my invention.

Figure 2 is a sectional view taken on the line 2—2 of Figure 1.

Figure 3 is an end elevation partly in section illustrating the device.

Referring in detail to the drawing, the numeral 1 indicates a tubular shaped body in which is slidably supported a sleeve 2 provided with a bore 3 to receive an axle spindle 4. One end of the sleeve has a reduced opening of a size to receive the screw threaded reduced end 5 of the axle spindle. The axle spindle 4 is provided with a brake flange bearing 6 for supporting on the axle spindle a brake flange (not shown). After axle spindles of this character have been in use for a period of time the bearing 6 wears providing play between the bearing 6 and the brake drum flange. This play creates undesirable noise. The present practice when this wear occurs is to replace either the axle spindle or the brake drum flange, either of which is expensive. With the use of the present invention this excessive expense can be eliminated by dressing down the bearing 6 to permit mounting thereon a bushing (not shown) for the purpose of taking up play and eliminate the noise caused by the brake drum flange moving relative to the bearing 6. The present invention, a portion of which has heretofore been described provides a very economical tool for dressing down the bearing 6.

Secured in one end of the body 1 is an end plate 7 having a key hole shaped slot 8 to receive and rotatably support a feed nut 9. The feed nut 9 is grooved to receive the walls of the slot 8 and provides means for permitting the nut to rotate freely and be held against endwise movement with respect to the body 1. At any time the feed nut can be removed from the plate 7 by moving said nut into the enlarged portion of the key hole slot. A feed stem 10 is threaded through the feed nut and one end is enlarged to form a head 11 having a screw threaded socket 12 therein. The head is adapted to be threaded onto the reduced screw threaded end 5 of the axle spindle and against the end of the sleeve 2. By rotating the feed nut 9 the sleeve 2 may be advanced endwise of the body 1 for the purpose of advancing the bearing relative to a cutting tool 13.

Formed on the body 1 are spaced guide flanges 14 between which is received and pivoted thereto a tool holder 15. One end of the tool holder projects beyond one end of the body 1 and has the tool 13 adjustably secured thereto. The other end of the tool holder has threaded therein a set bolt 16 engageable with the body for the purpose of regulating the depth of cut by the tool 13.

Secured to the body 1 intermediate its ends is a handle 17.

In operation, the tool is applied to an axle spindle, as shown in Figure 1, and the set screw 16 is adjusted to bring the cutting tool 13 in engagement with the bearing of the spindle axle and by rotating the body 1 about the axle spindle and turning the nut 9 the cutting tool 13 will be caused to remove a portion of the face of the bearing about the entire circumference of the bearing as well as the length of the bearing.

What is claimed is:

A cutter comprising a tubular shaped body, a sleeve having said body slidable thereon and provided with a bore to receive an axle spindle with one end af the latter projecting beyond one end of said sleeve, a plate closing one end of the body and having a key hole shaped slot, a feed nut having an annular groove journaled on the plate by the walls of the slot fitting in the groove of said feed nut, a feed stem received by the feed nut and extending into the body, a head formed on the feed stem and bearing against the sleeve and threaded on the axle spindle, a handle secured on said body, spaced flanges formed on said body, a tool holder pivoted on said flanges, a cutting tool carried by said holder, and an adjusting screw carried by said holder to engage with the body for adjusting the cutting tool relative to a bearing on the axle spindle.

ALBERT C. SCHMITT.